UNITED STATES PATENT OFFICE.

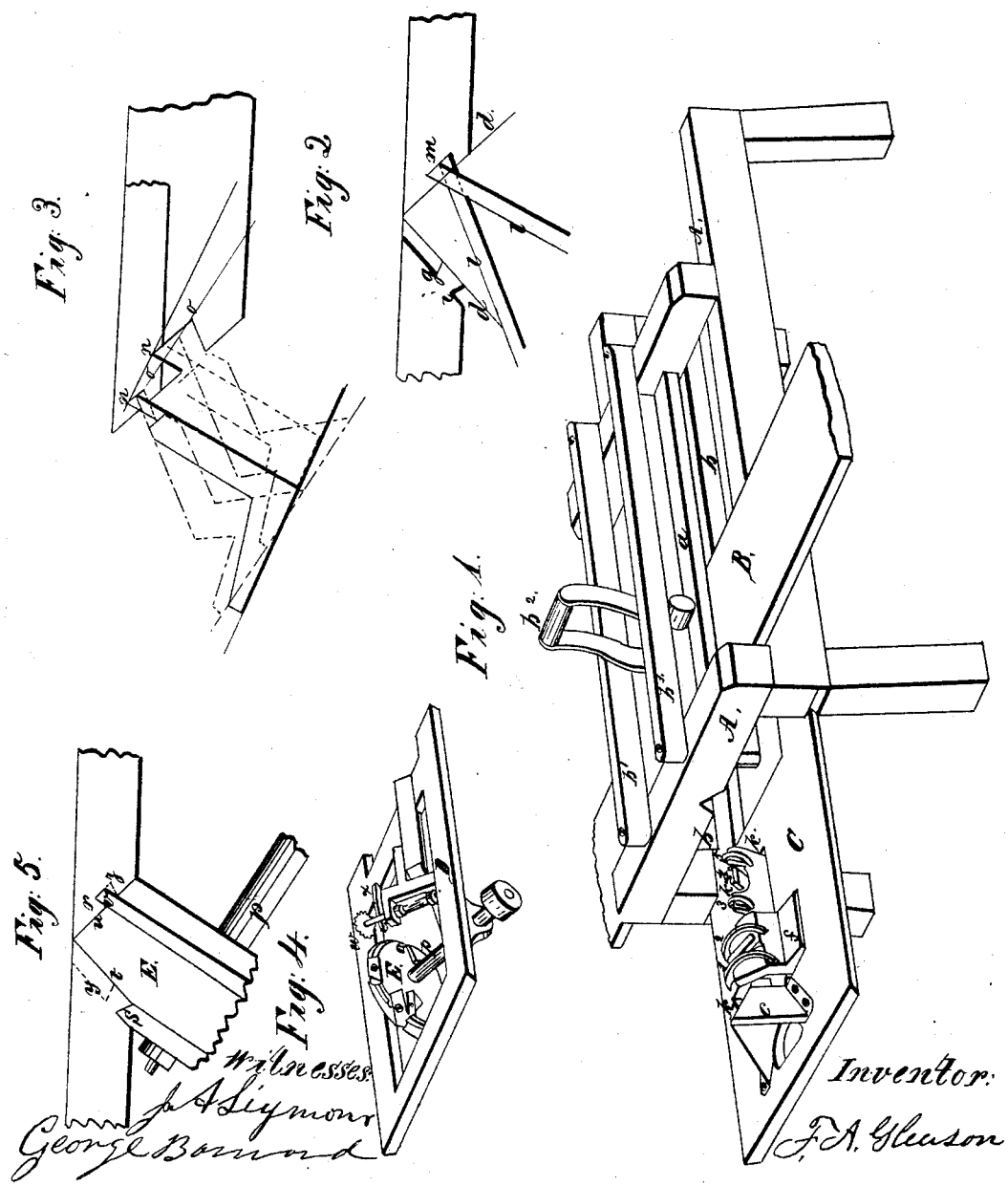

F. A. GLEASON, OF ROME, NEW YORK.

IMPROVED MACHINE FOR MITER-DOVETAILING.

Specification forming part of Letters Patent No. 37,910, dated March 17, 1863.

*To all whom it may concern:*

Be it known that I, F. A. GLEASON, of Rome, in the county of Oneida and State of New York, have invented a new and useful Machine for Miter-Dovetailing; and I do hereby declare that the following is a full, clear, and exact description of the construction and operation of the same, reference being had to the annexed drawings, making a part of this specification, in which—

Figures 1 and 4 are perspective views, and 2, 3, and 5 are detached sectional views.

The nature of my invention consists in arranging a series of cutters at such angles and in such relative positions that they shall cut both parts—i. e., tongue and groove—of a miter-dovetail joint complete at any intermediate point between the extremes of any piece of lumber.

To enable others skilled in mechanics to make and use my invention, I will proceed to describe its construction and operation.

I construct the frame A A, Fig. 1, of any convenient size, according to the work for which it is intended, and of such form that the piece of lumber B to be wrought is placed under the rail $a$, to which it is secured by the clamp, which consists of two pieces, $b\ b$, below the board and two, $b'\ b'$, above, connected by screws at the ends. The clamps are operated by two cams connected by the handle $b^2$. Within the frame are ways in which runs a reciprocating slide or carriage, C. Upon this slide I place one, or, if for heavy work, two or three turtle-bill or V cutters, $c$, of such form as to cut a perfect miter, as represented by the lines $d\ d$, Fig. 2. Following these is placed a cutter-stock, $f$, in which cutters 1 2 are fixed, which cut the angle $g$, Fig. 2, and parallel with this is a V-cutter, $h$, which cuts the angle $i$, Fig. 2, forming a dovetail tongue. Following these are placed two cutter-stocks, $k\ k$, so arranged that their respective cutters 3, 4, and 5 cross each others' lines, as seen at $l\ l$, Fig. 2, which, consecutively and alternately following each other, cut the dovetail groove $m$. These cutter-stocks are all set upon inclines parallel with lines drawn across like angles of the different sizes of dovetail, parts of which are represented at $n\ n\ o\ o$, Fig. 3, by which means the adjustment to position and depth of cut required for different thicknesses of lumber are simultaneous. The cutters are made semicircular for compactness, that form admitting of their following each other more closely.

There may be various other mechanical devices involving the principles of my invention and by which the same result may be accomplished, one of which is shown at Fig. 4, in which D represents a slide which moves in the same ways as the former. In it runs an arbor or mandrel, $p$, set obliquely at right angles to a line from one side of the groove at $r$, Fig. 5. Upon this is fixed a disk, E, whose periphery is turned to the angles formed by the lines $s\ t\ u\ v$ and cutters fitted to each of them. Following this are two small adjustable counter-stocks, carrying arbors with small disk-cutters $w\ x$ or circular saws, either of which may be used, one cutting to the dotted lines $y$, the other to the dotted lines $z$, completing the work. The reciprocating motion may be given to the slides by rack and pinion, screw, or any other method in common use.

Cutting-tools other than those above described may be used—such as circular saws, stationary cutters, &c.; but I neither claim nor limit myself to any particular kind, as changing these does not change the nature nor principles of my invention. Neither do I limit myself to any precise form or position of parts, nor to any particular device for moving or operating them, as these may be largely varied without essential or substantial variation from the character of my invention, as herein set forth.

Miter-dovetailing machines hitherto made are adapted only to work upon the extremes of lumber previously cut to the desired length; but

What I claim as my invention, and for which I desire Letters Patent, is—

The particular arrangement of cutting-tools by which a miter-dovetail joint, complete in both its parts—i. e., tongue and groove—may be cut at any intermediate point between extremes of any piece of lumber, doing the cross-cutting and dovetailing simultaneously in the same operation.

F. A. GLEASON.

Witnesses:
GEORGE BARNARD,
JOHN A. SEYMOUR.